United States Patent
Medvedeva et al.

(10) Patent No.: US 11,131,012 B2
(45) Date of Patent: Sep. 28, 2021

(54) HOT WORK TOOL STEEL

(71) Applicant: Uddeholms AB, Hagfors (SE)

(72) Inventors: Anna Medvedeva, Uddeholm (SE);
Jerker Andersson, Karlstad (SE);
Rikard Robertsson, Lakene (SE);
Cherin Nilsson, Hagfors (SE);
Sebastian Ejnermark, Hammaro (SE)

(73) Assignee: UDDEHOLMS AB, Hagfors (SE)

( * ) Notice: Subject to any disclaimer, the term of this patent is extended or adjusted under 35 U.S.C. 154(b) by 136 days.

(21) Appl. No.: 16/064,699

(22) PCT Filed: Nov. 28, 2016

(86) PCT No.: PCT/SE2016/051174
§ 371 (c)(1),
(2) Date: Jun. 21, 2018

(87) PCT Pub. No.: WO2017/111680
PCT Pub. Date: Jun. 29, 2017

(65) Prior Publication Data
US 2019/0003021 A1 Jan. 3, 2019

(30) Foreign Application Priority Data
Dec. 22, 2015 (SE) .................... 1551702-2

(51) Int. Cl.
| | | |
|---|---|---|
| C22C 38/24 | (2006.01) | |
| C21D 6/00 | (2006.01) | |
| C22C 38/00 | (2006.01) | |
| C22C 38/02 | (2006.01) | |
| C22C 38/04 | (2006.01) | |
| C22C 38/06 | (2006.01) | |
| C22C 38/22 | (2006.01) | |
| C22C 33/02 | (2006.01) | |
| B33Y 70/00 | (2020.01) | |
| B22F 3/15 | (2006.01) | |
| B22F 3/24 | (2006.01) | |
| B22F 9/08 | (2006.01) | |
| C21D 1/25 | (2006.01) | |
| C21D 1/18 | (2006.01) | |
| C21D 6/02 | (2006.01) | |

(52) U.S. Cl.
CPC .............. *C22C 38/24* (2013.01); *B22F 3/15* (2013.01); *B22F 3/24* (2013.01); *B22F 9/082* (2013.01); *B33Y 70/00* (2014.12); *C21D 6/002* (2013.01); *C21D 6/005* (2013.01); *C21D 6/008* (2013.01); *C22C 33/0285* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *B22F 2003/248* (2013.01); *B22F 2301/35* (2013.01); *C21D 1/18* (2013.01); *C21D 1/25* (2013.01); *C21D 6/02* (2013.01); *C21D 2211/001* (2013.01); *C21D 2211/002* (2013.01); *C21D 2211/004* (2013.01); *C21D 2211/008* (2013.01)

(58) Field of Classification Search
CPC ........... B22F 2003/248; B22F 2301/35; B33Y 70/00; C21D 1/18; C21D 6/002; C21D 6/005; C21D 6/008; C21D 6/02; C22C 38/001; C22C 38/22; C22C 38/24
USPC ........................................... 148/320
See application file for complete search history.

(56) References Cited

U.S. PATENT DOCUMENTS

| | | | | |
|---|---|---|---|---|
| 6,348,109 | B1 * | 2/2002 | Sandberg ................ | C22C 38/22 148/324 |
| 2006/0060270 | A1 | 3/2006 | Klueh et al. | |
| 2008/0302501 | A1 | 12/2008 | Binot et al. | |
| 2010/0150772 | A1 | 6/2010 | Siller et al. | |
| 2015/0118098 | A1 * | 4/2015 | Valls ...................... | C22C 38/005 420/102 |
| 2016/0348222 | A1 * | 12/2016 | Isaac ...................... | C22C 38/30 |

FOREIGN PATENT DOCUMENTS

| | | | |
|---|---|---|---|
| CN | 1295624 A | 5/2001 | |
| CN | 103834869 A | 6/2014 | |
| EP | 0939140 A1 * | 9/1999 | ............ C22C 38/22 |
| EP | 1087030 A2 | 3/2001 | |
| JP | H06172943 A | 6/1994 | |
| JP | 2000017384 A | 1/2000 | |
| JP | 2001214238 A | 8/2001 | |
| JP | 2002509986 A | 4/2002 | |
| JP | 2008095181 A | 4/2008 | |
| JP | 2012201909 A | 10/2012 | |
| JP | 2013087322 A | 5/2013 | |
| JP | 2014512456 A | 5/2014 | |

(Continued)

OTHER PUBLICATIONS

NPL: English on-line translation of EP-0939140-A1, Sep. 1999 (Year: 1999).*

(Continued)

*Primary Examiner* — Jie Yang
(74) *Attorney, Agent, or Firm* — Karceski IP Law, PLLC

(57) ABSTRACT

The invention relates hot work tool steel. The steel comprises the following main components (in wt. %):

| | |
|---|---|
| C | 0.27-0.38 |
| Si | 0.10-0.35 |
| Mn | 0.2-0.7 |
| Cr | 4.5-5.5 |
| Mo | 2.05-2.90 |
| V | 0.4-0.6 |
| N | 0.01-0.12 |
| H | ≤0.0004 |
| S | ≤0.0015 | balance optional elements, iron and impurities.

15 Claims, No Drawings

(56) References Cited

FOREIGN PATENT DOCUMENTS

| | | |
|---|---|---|
| JP | 2014177710 A | 9/2014 |
| JP | 2015193867 A | 11/2015 |
| JP | 2015221933 A | 12/2015 |
| WO | WO-9950468 A1 | 10/1999 |
| WO | WO-2010074017 A1 | 7/2010 |
| WO | WO-2012119925 A1 | 9/2012 |

OTHER PUBLICATIONS

NPL: on-line English translation of JP2014177710A, Sep. 2014 (Year: 2014).*

Office Action, corresponding European Application No. 16879476.6, dated May 13, 2019.

Office Action, corresponding in Chinese Patent Application No. 201680075284.8, dated Sep. 4, 2019. (English Translation).

Office Action, corresponding in Taiwanese Patent Application No. 105139668, dated Jan. 22, 2020. (English Translation).

Extended European Search Report for Application No. EP 16 87 9476.6, dated Nov. 26, 2018.

International Search Report for Application No. PCT/SE2016/051174, dated Feb. 28, 2017.

Chinese Office Action dated Sep. 24, 2020, for Chinese Patent Application No. 201680075284.8.

Japanese Notice of Reasons for Rejection dated Oct. 6, 2020, for Japanese Patent Application No. 2018-531092.

Indian Office Action dated Mar. 31, 2021, for Indian Patent Application No. 201847027140.

Korean Office Action dated Feb. 1, 2021, for Korean Patent Application No. 10-2018-7020831.

Japanese Office Action dated Jun. 4, 2021, for Japanese Patent Application No. 2018531092.

Korean Office Action dated Jun. 30, 2021, for Korean Patent Application No. 10-2018-7020831.

* cited by examiner

HOT WORK TOOL STEEL

TECHNICAL FIELD

The invention relates to a hot work tool steel.

BACKGROUND OF THE INVENTION

Vanadium alloyed matrix tool steels have been on market for decades and attained a considerable interest because of the fact that they combine a high wear resistance with an excellent dimensional stability and because they have a good toughness. These steels have a wide range of applications such as for die casting and forging. The steels are generally produced by conventional metallurgy followed by Electro Slag Remelting (ESR).

Although the vanadium alloyed matrix tool steels produced by ESR have better properties than conventionally produced tool steels with respect to heat checking, gross cracking, hot wear and plastic deformation, there is a need for further improvements in order to reduce the risk for hot work tool failure, such as heat checking and gross cracking in high pressure die casting. In addition, it would be beneficial to further improve the hot strength and temper resistance of hot work tool steel.

DISCLOSURE OF THE INVENTION

The object of the present invention is to provide a hot work tool steel having an improved property profile leading to an increased life of the tool.

Another object of the present invention is to improve the heat checking, while still maintaining a good hot wear resistance and a good resistance to gross cracking. Still another object is provide a steel composition, which in powder form is suitable for Additive Manufacturing (AM), in particular for making or repairing injection moulding tools and dies.

The foregoing objects, as well as additional advantages are achieved to a significant measure by providing a hot work tool steel having a composition as set out in the alloy claims.

The invention is defined in the claims.

DETAILED DESCRIPTION

The importance of the separate elements and their interaction with each other as well as the limitations of the chemical ingredients of the claimed alloy are briefly explained in the following. All percentages for the chemical composition of the steel are given in weight % (wt. %) throughout the description. The amount of hard phases is given in volume % (vol. %). Upper and lower limits of the individual elements can be freely combined within the limits set out in the claims.

Carbon (0.27-0.38%)
is to be present in a minimum content of 0.27%, preferably at least 0.28, 0.29, 0.30, 0.31, 0.32, 0.33 or 0.34%. The upper limit for carbon is 0.38% and may be set to 0.37, 0.36 or 0.35%. Preferred ranges are 0.30-0.38% and 0.33-0.37%. In any case, the amount of carbon should be controlled such that the amount of primary carbides of the type $M_{23}C_6$, $M_7C_3$ and $M_6C$ in the steel is limited, preferably the steel is free from such primary carbides.

Silicon (0.10-0.35%)
Silicon is used for deoxidation. Si is present in the steel in a dissolved form. Si is a strong ferrite former and increases the carbon activity and therefore the risk for the formation of undesired carbides, which negatively affect the impact strength. Silicon is also prone to interfacial segregation, which may result in decreased toughness and thermal fatigue resistance. Si is therefore limited to 0.35%. The upper limit may be 0.34, 0.32, 0.31, 0.30, 0.29, 0.28, 0.27, 0.26, 0.25, 0.24, 0.23 and 0.22%. The lower limit may be 0.12, 0.14, 0.16, 0.18 and 0.20%. Preferred ranges are 0.10-0.25% and 0.15-0.24%.

Manganese (0.2-0.7%)
Manganese contributes to improving the hardenability of the steel and together with sulphur manganese contributes to improving the machinability by forming manganese sulphides. Manganese shall therefore be present in a minimum content of 0.2%. The lower limit may be set to 0.25, 0.3, 0.35, 0.4, 0.45 or 0.5%. At higher sulphur contents manganese prevents red brittleness in the steel. The steel shall contain maximum 0.7% Mn. The upper limit may be set to 0.65, 0.6, 0.55 or 0.5%.

Chromium (4.5-5.5%)
Chromium is to be present in a content of at least 4.0% in order to provide a good hardenability in larger cross sections during heat treatment. If the chromium content is too high, this may lead to the formation of high-temperature ferrite, which reduces the hot-workability. The lower limit may be 4.6, 4.7, 4.8 or 4.9%. The upper limit may be 5.4, 5.3, 5.2 or 5.1%.

Molybdenum (2.05-2.90%)
Mo is known to have a very favourable effect on the hardenability. Molybdenum is essential for attaining a good secondary hardening response. The minimum content is 2.05%, and may be set to 2.1, 2.15, 2.2, 2.25 or 2.3%. Molybdenum is a strong carbide forming element and also a strong ferrite former. The maximum content of molybdenum is therefore 2.9%. Preferably Mo is limited to 2.8, 2.7, 2.6, 2.5, 2.4 or 2.35%.

Vanadium (0.4-0.6%)
Vanadium forms evenly distributed primary precipitated carbides and carbonitrides of the type V(N,C) in the matrix of the steel. This hard phase may also be denoted MX, wherein M is mainly V but Cr and Mo may be present and X is one or more of C, N and B. Vanadium shall therefore be present in an amount of 0.4-0.6%. The upper limit may be set to 0.59, 0.58, 0.57, 0.56 or 0.55%. The lower limit may be 0.42, 0.43, 0.44, 0.45, 0.46, 0.47, 0.48, 0.49, 0.50, 0.51 or 0.52%.

Ratio V/C (1.35-1.65)
The present inventors have found that the tensile strength at room temperature and at elevated temperature is influenced by the ratio of the carbide forming element vanadium to the carbon content in the steel. The reason is believed to be related to the fact that these properties depends both on the dissolved content of carbon in the matrix and on the precipitated carbon. Also the toughness is influenced by the ratio. For these reasons it is preferable that the ratio is 1.35-1.65, preferably 1.40-1.60 or more preferably 1.45-1.55.

Ratio V+8.8 (N-0.005)/C (1.55-1.90)
If a more pronounced secondary hardening is desired, then the total amount of vanadium may be increased in order to compensate for some or all of the vanadium which bound to the more stable nitride. For these reasons it is preferable that the ratio is 1.55-1.90. It may be set to 1.60-1.85 or more preferably 1.65-1.80.

Aluminium (0.001-0.06%)
Aluminium is used for deoxidation in combination with Si and Mn. The lower limit is set to 0.001, 0.003, 0.005 or 0.007% in order to ensure a good deoxidation. The upper limit is restricted to 0.06% for avoiding precipitation of undesired phases such as AN. The upper limit may be 0.05, 0.04, 0.03, 0.02 or 0.015%.

Nitrogen (0.01-0.12%)

Nitrogen is restricted to 0.010-0.12% in order to obtain the desired type and amount of hard phases, in particular V(C,N). When the nitrogen content is properly balanced against the vanadium content, vanadium rich carbonitrides V(C,N) will form. These will be partly dissolved during the austenitizing step and then precipitated during the tempering step as particles of nanometer size. The thermal stability of vanadium carbonitrides is considered to be better than that of vanadium carbides, hence the tempering resistance of the tool steel may be improved and the resistance against grain growth at high austenitizing temperatures is enhanced. The lower limit may be 0.011, 0.012, 0.013, 0.014, 0.015, 0.016, 0.017, 0.018, 0.019 or 0.02%. The upper limit may be 0.11, 0.10, 0.09, 0.08, 0.07, 0.06, 0.05, 0.04 or 0.03%.

Hydrogen (≤0.0004%)

Hydrogen is known to have a deleterious effect on the properties of the steel and to cause problems during processing. In order to avoid problems related to hydrogen the molten steel is subjected to vacuum degassing. The upper limit is 0.0004% (4 ppm) and may be limited to 3, 2.5, 2, 1.5 or 1 ppm.

Nickel (≤1.5%)

Nickel may be present in an amount of ≤1.5%. It gives the steel a good hardenability and toughness. However, because of the expense, the nickel content of the steel should be limited. The upper limit may therefore be set to 1.0, 0.8, 0.5 or 0.3%. However, Ni is normally not deliberately added.

Copper (≤2.0%)

Cu is an optional element, which may contribute to increasing the hardness and the corrosion resistance of the steel. If used, the preferred range is 0.02-1%. However, it is not possible to extract copper from the steel once it has been added. This drastically makes the scrap handling more difficult. For this reason, copper is normally not deliberately added.

Cobalt (≤8%)

Co is an optional element. Co causes the solidus temperature to increase and therefore provides an opportunity to raises the hardening temperature, which may be 15-30° C. higher than without Co. During austenitization it is therefore possible to dissolve larger fraction of carbides and thereby enhance the hardenability. Co also increases the $M_s$ temperature. However, large amount of Co may result in a decreased toughness and wear resistance. The maximum amount is 8% and, if added, an effective amount may be 2-6%, in particular 4 to 5%. However, for practical reasons, such as scrap handling, deliberate additions of Co is not made. The maximum impurity content may then be set to 1%, 0.5%, 0.3%, 0.2% or 01%.

Tungsten (≤0.5%)

In principle, molybdenum may be replaced by twice as much with tungsten because of their chemical similarities. However, tungsten is expensive and it also complicates the handling of scrap metal. The maximum amount is therefore limited to 0.5%, preferably 0.3% and more preferably no deliberate additions are made.

Niobium (≤0.5%)

Niobium is similar to vanadium in that it forms carbonitrides of the type M(N,C) and may in principle be used to replace part of the vanadium but that requires the double amount of niobium as compared to vanadium. However, Nb results in a more angular shape of the M(N,C). The maximum amount is therefore 0.5%, preferably 0.05% and most preferably no deliberate additions are made.

Ti, Zr and Ta

These elements are carbide formers and may be present in the alloy in the claimed ranges for altering the composition of the hard phases. However, normally none of these elements are added.

Boron (≤0.01%)

B may be used in order to further increase the hardness of the steel. The amount is limited to 0.01%, preferably ≤0.005%. A preferred range for the addition of B is 0.001-0.004%.

Ca, Mg and REM (Rare Earth Metals)

These elements may be added to the steel in the claimed amounts for modifying the non-metallic inclusion and/or in order to further improve the machinability, hot workability and/or weldability.

Impurity Elements

P, S and O are the main impurities, which have a negative effect on the mechanical properties of the steel. P may therefore be limited to 0.03%, preferably to 0.01%. S is limited to 0.0015 and may be limited to 0.0012, 0.0010, 0.0008 or 0.0005%. 0 may be limited to 0.0015, 0.0012, 0.0010, 0.0008, 0.0006 or 0.0005%.

Steel Production

The tool steel having the claimed chemical composition can be produced by conventional metallurgy including melting in an Electric Arc Furnace (EAF) and further refining in a ladle and vacuum treatment. Optionally the steel may be subjected to Electro Slag Remelting (ESR) in order to further improve the cleanliness and the microstructural homogeneity.

Normally the steel is subjected to hardening and tempering before being used. Austenitizing may be performed at an austenitizing temperature ($T_A$) in the range of 1000-1070° C., preferably 1030-1050° C. A typical $T_A$ is 1040° C. with a holding time of 30 minutes followed by rapid quenching. The tempering temperature is chosen according to the hardness requirement and is performed at least twice at 600-650° C. for 2 hours (2×2 h) followed by cooling in air.

Example 1

In this example, a steel having the following composition was produced by EAF-melting, ladle refining and vacuum degassing (VD) (in wt. %):

| | |
|---|---|
| C | 0.35 |
| Si | 0.18 |
| Mn | 0.47 |
| Cr | 5.05 |
| Mo | 2.34 |
| V | 0.54 |
| Al | 0.009 |
| P | 0.005 |
| S | 0.0003 |
| H | 0.00005 |
| N | 0.0051 |
| O | 0.0006 |
| V/C | 1.54 | balance iron and impurities.

After vacuum degassing the steel was subjected to nitrogen alloying by cored wire injection. The final nitrogen content after said trimming was 0.0142 wt. %.

The steel was cast into ingots and subjected hot working.

The steel was austenitized at 1040° C. for 30 minutes and hardened by gas quenching and tempering twice at 600° C. for 2 hours (2×2 h) followed by cooling in air.

The effect of the nitrogen alloying on the composition of the matrix and the amount of primary MX at three different austenitizing temperatures was calculated using Thermo-Calc. The results are shown in Table 1.

TABLE 1

| Matrix composition (austenite) | | | | | | | |
|---|---|---|---|---|---|---|---|
| | C | Si | Mn | Cr | Mo | V | Vol. (%) MX |
| 0.0051% N | | | | | | | |
| 1030° C. | 0.335 | 0.18 | 0.47 | 5.05 | 2.32 | 0.46 | 0.19 |
| 1040° C. | 0.338 | 0.18 | 0.47 | 5.05 | 2.32 | 0.47 | 0.16 |
| 1050° C. | 0.340 | 0.18 | 0.47 | 5.05 | 2.32 | 0.48 | 0.13 |
| 0.0142% N | | | | | | | |
| 1030° C. | 0.325 | 0.18 | 0.47 | 5.05 | 2.32 | 0.38 | 0.37 |
| 1040° C. | 0.328 | 0.18 | 0.47 | 5.05 | 2.32 | 0.40 | 0.34 |
| 1050° C. | 0.331 | 0.18 | 0.47 | 5.05 | 2.32 | 0.41 | 0.30 |

Table 1 reveals that the amount of the undissolved hard phase (MX) in the nitrogen alloyed steel is significantly higher than the amount in the unalloyed steel at all three temperatures. The MX-phase is responsible for pinning the grain boundaries and thereby obstructs the grains from growing. Accordingly, the inventive nitrogen alloyed is less prone to grain growth at hardening temperatures. This was also confirmed by experiments, which showed that the steel with the low nitrogen content had a marked increase in grain size at 1060° C. whereas the nitrogen alloyed steel was stable against grain growth to a temperature exceeding 1080° C. Accordingly, a higher hardening temperature may be used for the nitrogen alloyed steel without deleterious grain growth. Thereby it is possible to influence the balance of properties in the die material in order to reduce the propensity for heat checking and/or gross cracking and thereby extend the die life.

Example 2

An alloy was melted in an induction furnace and subjected to Nitrogen gas (5N) atomizing.

| C | 0.34 |
|---|---|
| Si | 0.16 |
| Mn | 0.44 |
| Cr | 5.01 |
| Mo | 2.33 |
| V | 0.53 |
| Al | 0.008 |
| N | 0.044 |
| O | 0.0024 |
| V/C | 1.59 | balance iron and impurities.

The powder was sieved to <500 μm, filled in steel capsules having a diameter of 63 mm and a height of 150 mm. HIPing was performed at a temperature of 1150° C., the holding time was 2 hours and the pressure 110 MPa. The cooling rate was <1° C./s. The material thus obtained was forged at 1130° C. to the dimension 20×30 mm. Soft annealing was performed at 900° C. with a cooling rate of 10° C./h down to 750° C. and thereafter cooling freely in air. The amount of undissolved MX was higher than in the previous example and the nitrogen content was higher. Due to this fact and to the fine distribution of the nitrogen rich vanadium carbonitride (MX) the steel was found to be very robust against grain growth.

Example 3

A powder having the same composition as in Example 2 was subjected to sieving in order to obtain a powder having a narrow grain size distribution in the range of 10-60 μm. It was found that the powder could successfully be used for laser cladding repairs of dies as well as for rapid prototyping of e.g. dies with conformal cooling channels. Accordingly, it would appear that the steel alloy powder is suitable for Additive Manufacturing.

INDUSTRIAL APPLICABILITY

The tool steel of the present invention is useful in large dies requiring a good hardenability and a good resistance against heat checking and gross cracking. Atomized powder of the alloy can be used to produce HIPed products having superior structural uniformity. Powder of the alloy can be used for producing or repairing dies, in particular by additive manufacturing methods.

The invention claimed is:

1. A steel for hot working consisting of, in weight % (wt. %):

| C | 0.27-0.37 |
|---|---|
| Si | 0.10-0.30 |
| Mn | 0.2-0.7 |
| Cr | 4.5-5.5 |
| Mo | 2.2-2.6 |
| V | 0.4-0.6 |
| N | 0.01-0.12 |
| H | ≤0.0004 |
| S | ≤0.0010 |
| V/C | 1.4-1.60 |
| (V + 8.8(N − 0.005))/C | 1.55-1.19 | optionally one or more of

| Al | 0.005-0.06 |
|---|---|
| Cu | ≤2 |
| W | ≤0.5 |
| Nb | ≤0.5 |
| Ti | ≤0.05 |
| Zr | ≤0.05 |
| Ta | ≤0.05 |
| B | ≤0.01 |
| Ca | 0.00005-0.009 |
| Mg | ≤0.01 |
| REM | ≤0.2, and | balance Fe apart from impurities,
wherein primary precipitated MX is 0.2-1 vol. %.

2. The steel according to claim 1, also fulfilling at least one of the following requirements, in weight % (wt. %):

| C | 0.30-0.37 |
|---|---|
| Si | 0.15-0.30 |
| Mn | 0.4-0.6 |

| | |
|---|---|
| Cr | 4.6-5.4 |
| V | 0.5-0.6 |
| N | 0.011-0.08 |
| H | ≤0.0003 |
| Cu | 0.02-1 |
| W | ≤0.3 |
| Nb | ≤0.05 |
| Ti | ≤0.01 |
| Zr | ≤0.01 |
| Ta | ≤0.01 |
| B | ≤0.005, and |
| Mg | ≤0.001. |

3. The steel according to claim 1, also fulfilling at least one of the following requirements, in weight % (wt. %):

| | |
|---|---|
| C | 0.33-0.37 |
| Si | 0.15-0.29 |
| N | 0.012-0.07 |
| H | ≤0.0002 |
| Cu | 0.02-0.5 |
| W | ≤0.1 |
| B | 0.001-0.004 |
| Mg | 0.00005-0.001, and |
| Ca | 0.0001-0.009. |

4. The steel according to claim 1, also fulfilling at least one of the following requirements, in weight % (wt. %):

| | |
|---|---|
| C | 0.33-0.37 |
| Si | 0.16-0.26 |
| Mn | 0.45-0.55 |
| Cr | 4.8-5.2 |
| V | 0.51-0.58 |
| N | 0.011-0.056 |
| H | ≤0.0003 |
| Cu | 0.02-0.3 |
| W | ≤0.1 |
| Nb | ≤0.05 |
| Mg | 0.0001-0.001 |
| Ca | 0.0001-0.001, and |
| V/C | 1.45-1.55. |

5. The steel according to claim 1, also fulfilling the following requirements, in weight % (wt. %):

| | |
|---|---|
| C | 0.30-0.37 |
| Si | 0.15-0.30 |
| Mn | 0.4-0.6 |
| V | 0.5-0.6 |
| N | 0.01-0.08, and |
| H | ≤0.0003. |

6. The steel according to claim 1, fulfilling the following requirements, in weight % (wt. %):

| | |
|---|---|
| C | 0.33-0.37 |
| Si | 0.16-0.26 |
| Mn | 0.45-0.55 |
| Cr | 4.8-5.2 |
| V | 0.51-0.58, and |
| N | 0.011-0.07. |

7. The steel according to claim 1, wherein the matrix comprises tempered martensite and/or bainite and the amount of retained austenite is limited to <6 vol. %.

8. The steel according to claim 7, wherein the matrix comprises tempered martensite and/or bainite and the amount of retained austenite is limited to ≤5 vol. %.

9. The steel according to claim 8, wherein the matrix comprises tempered martensite and/or bainite and the amount of retained austenite is limited to <4 vol. %.

10. The steel according to claim 9, wherein the matrix comprises tempered martensite and/or bainite and the amount of retained austenite is limited to ≤2 vol. %.

11. The steel according to claim 1, wherein the steel is provided in the form of a powder, having a size distribution in the range of 5-150 μm, wherein the mean size of the powder particles is in the range of 25-50 μm.

12. Use of a steel powder according to claim 11 for additive manufacturing, in particular, for repairing injection moulding tools.

13. The steel according to claim 1, wherein the steel is provided in the form of a powder, having a size distribution in the range of 10-100 μm, wherein the mean size of the powder particles is in the range of 25-50 μm.

14. The steel according to claim 1, wherein the steel is provided in the form of a powder, having a size distribution in the range of 10-60 μm, wherein the mean size of the powder particles is in the range of 25-50 μm.

15. The steel according to claim 1, wherein the content of primary precipitated MX is 0.3-1.0 vol. %.

\* \* \* \* \*